(12) United States Patent
Campbell

(10) Patent No.: US 6,546,088 B2
(45) Date of Patent: Apr. 8, 2003

(54) METHOD AND SYSTEM FOR RETRIEVAL OF LOST GOODS

(76) Inventor: Thomas Campbell, 921 White St., Apt. #2, Key West, FL (US) 33040

(*) Notice: Subject to any disclaimer, the term of this patent is extended or adjusted under 35 U.S.C. 154(b) by 0 days.

(21) Appl. No.: 09/867,211

(22) Filed: May 29, 2001

(65) Prior Publication Data

US 2002/0181667 A1 Dec. 5, 2002

(51) Int. Cl.$^7$ .............................................. H04M 11/00
(52) U.S. Cl. .................... 379/90.01; 379/45; 283/81; 283/70; 351/158; 119/856; 340/573.3
(58) Field of Search .................. 379/90.01, 45, 379/110.01, 93.01, 144.07; 283/70, 74, 75, 81; 351/158; 119/856; 340/5.1, 5.8, 5.9, 573.1, 573.3, 568.1

(56) References Cited

U.S. PATENT DOCUMENTS

| | | | | |
|---|---|---|---|---|
| 4,893,840 A | * | 1/1990 | Berkowitz | 283/81 |
| 5,036,610 A | * | 8/1991 | Fehr | 283/70 |
| 5,180,192 A | | 1/1993 | Herbert | |
| 5,570,081 A | * | 10/1996 | Holstrom | 340/573.3 |
| 5,878,116 A | * | 3/1999 | Scott | 379/67.1 |
| 5,912,956 A | * | 6/1999 | Longo et al. | 379/114.07 |
| 5,955,952 A | | 9/1999 | Bergman et al. | |
| 6,016,338 A | * | 1/2000 | Bansal et al. | 379/93.13 |
| 6,064,307 A | * | 5/2000 | Silver | 340/573.1 |
| 6,067,018 A | * | 5/2000 | Skelton et al. | 340/573.3 |
| 6,120,146 A | * | 9/2000 | Harris | 351/158 |
| 6,283,065 B1 | * | 9/2001 | Shorrock et al. | 119/856 |
| 6,401,095 B1 | * | 6/2002 | Adler | 707/10 |

\* cited by examiner

*Primary Examiner*—Wing Chan
(74) *Attorney, Agent, or Firm*—Akerman Senterfitt

(57) ABSTRACT

A method (50) of identifying and restoring an object to an owner who has lost the object includes the steps of affixing a pre-assigned identification number associated with the owner and a toll-free telephone number or website to the object (52). An information center is provided that contacts the owner (62) in response to receiving the pre-assigned identification number (56) from a finder. The owner is then enabled to receive information regarding the object and the finder after entering an owner personal identification number with the information center (63).

16 Claims, 2 Drawing Sheets

METHOD AND SYSTEM FOR RETRIEVAL OF LOST GOODS

FIELD OF THE INVENTION

This invention relates generally to a method and system for returning lost items, more particularly to a method and system for retrieval of lost personal items.

BACKGROUND OF THE INVENTION

Keys and other valuable personal items are often inadvertently left behind or lost without an easy way to return such items to their rightful owner, even when the finder of such items has full intention of returning such items. Tags or other information giving one's personal information such as a phone number or an address is an obvious means of enabling the return of lost goods, but at the cost of one's privacy and potentially at the cost of one's safety. Unfortunately, the finders of lost goods are not always well intentioned and could conceivably stalk and even cause further losses by robbing your home or vehicle. Likewise, the finder of such lost items may not necessarily want to divulge their information for personal safety, privacy or modesty reasons. Thus, a need exists for a system and method that enables the return of lost objects that could at least give the owner the option to remain anonymous.

SUMMARY OF THE INVENTION

In a first aspect of the present invention, a system for identifying and restoring an object to an owner who has lost the object comprises a tag that is affixed to the object that includes a pre-assigned identification number associated with the owner and a toll-free telephone number or website, a call or information center that contacts the owner in response to a call or email to the toll-free telephone number or web site receiving the pre-assigned identification number from a finder and enabling the owner to receive information regarding the object and the finder after entering an owner personal identification number.

In a second aspect of the present invention, a method of identifying and restoring an object to an owner who has lost the object comprises the steps of affixing a pre-assigned identification number associated with the owner and a toll-free telephone number or website to the object. An information center is provided that contacts the owner in response to receiving the pre-assigned identification number from a finder and enables the owner to receive information regarding the object and the finder after entering an owner personal identification number with the information center.

DETAILED DESCRIPTION OF THE DRAWINGS

Figures 1, 2:
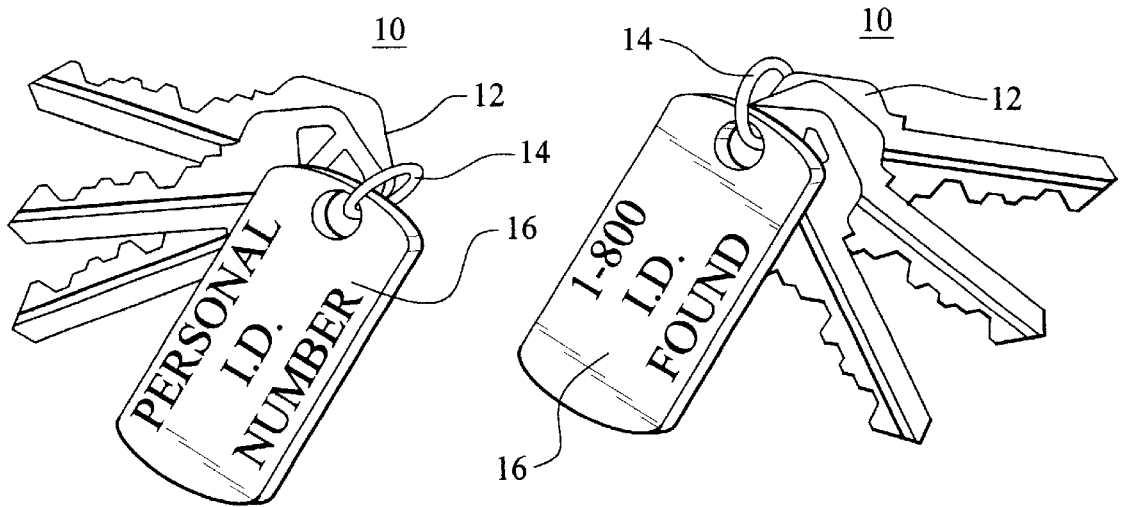
FIG. 1 is a key ring with an ID tag affixed to a set of keys in accordance with the present invention.
FIG. 2 is the key ring of FIG. 1 showing the opposing side of the ID Tag.

Referring to FIGS. 1 and 2, there is shown a set of keys 10 having a metallic or plastic tag 16 having an aperture 14 allowing the tag to be affixed to a key-ring 14 and the keys themselves. The tag 16 preferably has a personal identification (ID) number associated with the owner of the keys on one side and a toll-free number on an opposing side of the tag. Alternatively or in addition to the toll-free number, the tag could also list a web site (see FIG. 3) that would aide in the retrieval of such lost objects.

The tag 16 forms a part of a system for identifying and restoring an object to an owner who has lost the object. Such system preferably comprises the tag 16 that is affixed to the object that includes a pre-assigned identification number associated with the owner and a toll-free telephone number or a web site domain name, a call or information center that contacts the owner in response to a call or email to the toll-free telephone number or website respectively receiving the pre-assigned identification number from a finder. The call center could contact the owner by sending an automated phone call enabling the owner to respond or by sending an automated electronic mail notifying the owner to contact a website having access to a database containing information associated with the pre-assigned identification number. The pre-assigned identification number is ideally searched in the database at the call or information center. Preferably, the owner is enabled to receive information regarding the object and the finder after entering an owner personal identification number (again preferably available in a database at the call or information center) although other ways of confirming the owner is contemplated by the present invention and should be considered within the scope of the claims. One of the benefits of the system is that it enables the owner to anonymously receive information regarding the object and the finder without necessarily providing information regarding the owner to the finder. Additionally, an owner would be advised to contact the finder from a source other than a home telephone since addresses can be traced back through call identification and telephone directories with sequentially listed addresses. The owner can call from a public telephone, work phone, or use email. In one aspect of the present invention, the system allows the finder to create an anonymous email account to correspond with the owner. This way, both the finder and the owner can retain as much anonymity as each may desire. Another aspect of the present invention is that the system can automatically enter the finder in a lottery for a predetermined prize. The entry is preferably confirmed when the lost object is returned to the owner. In this manner, additional incentive can be provided to finders who may have little motivation to return lost objects to their rightful owners.

Figure 3:
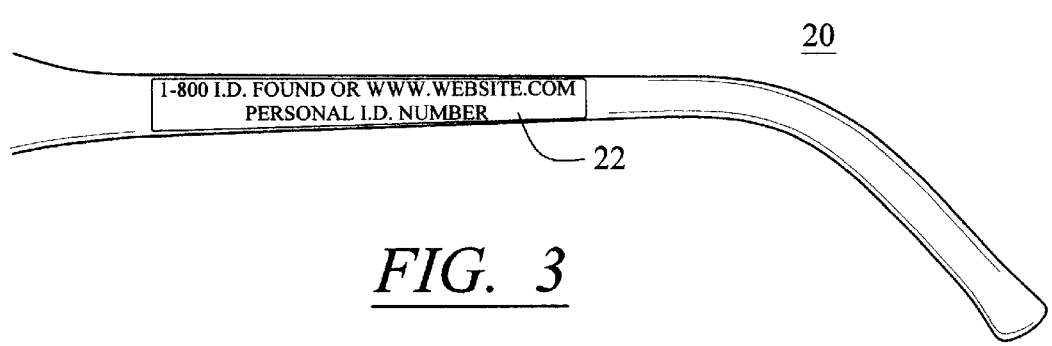
FIG. 3 illustrates an adhesive tag affixed to a sunglass frame in accordance with the present invention.
Figure 4:
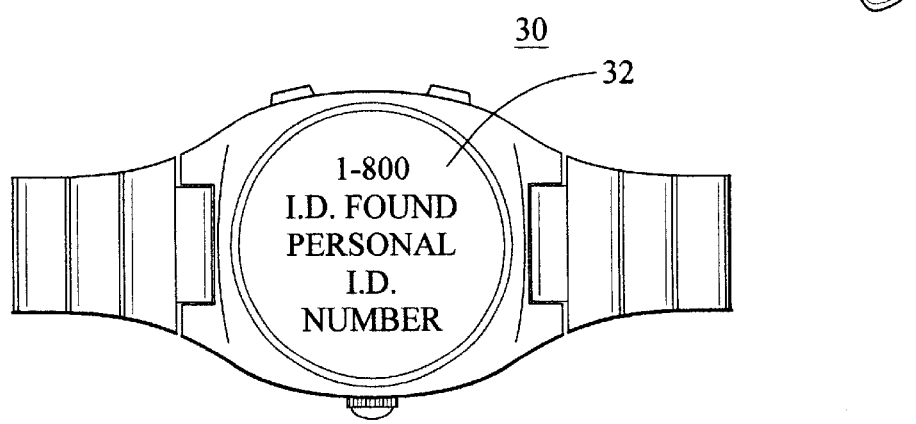
FIG. 4 illustrates an engraving of the ID information on the back of a valuable article in accordance with the present invention.

It should be noted that the tag could take on various forms depending on the object that the tag is being affixed to. The tag can be as simple as an adhesive sticker 22 that is applied to the object such as a sunglass frame 20 as shown in FIG. 3. Alternatively, the tag 32 can be etched or engraved on to a surface of a valuable object such as a watch 30 as shown in FIG. 4. ID tags could be used on a variety of objects including cameras, camcorders, golf bags, golf clubs, fishing equipment, bicycles, backpacks, laptop computers, cell phones, luggage, briefcases, jewelry, leather coats, furs, eyeglasses or any other item of value.

Figure 5:
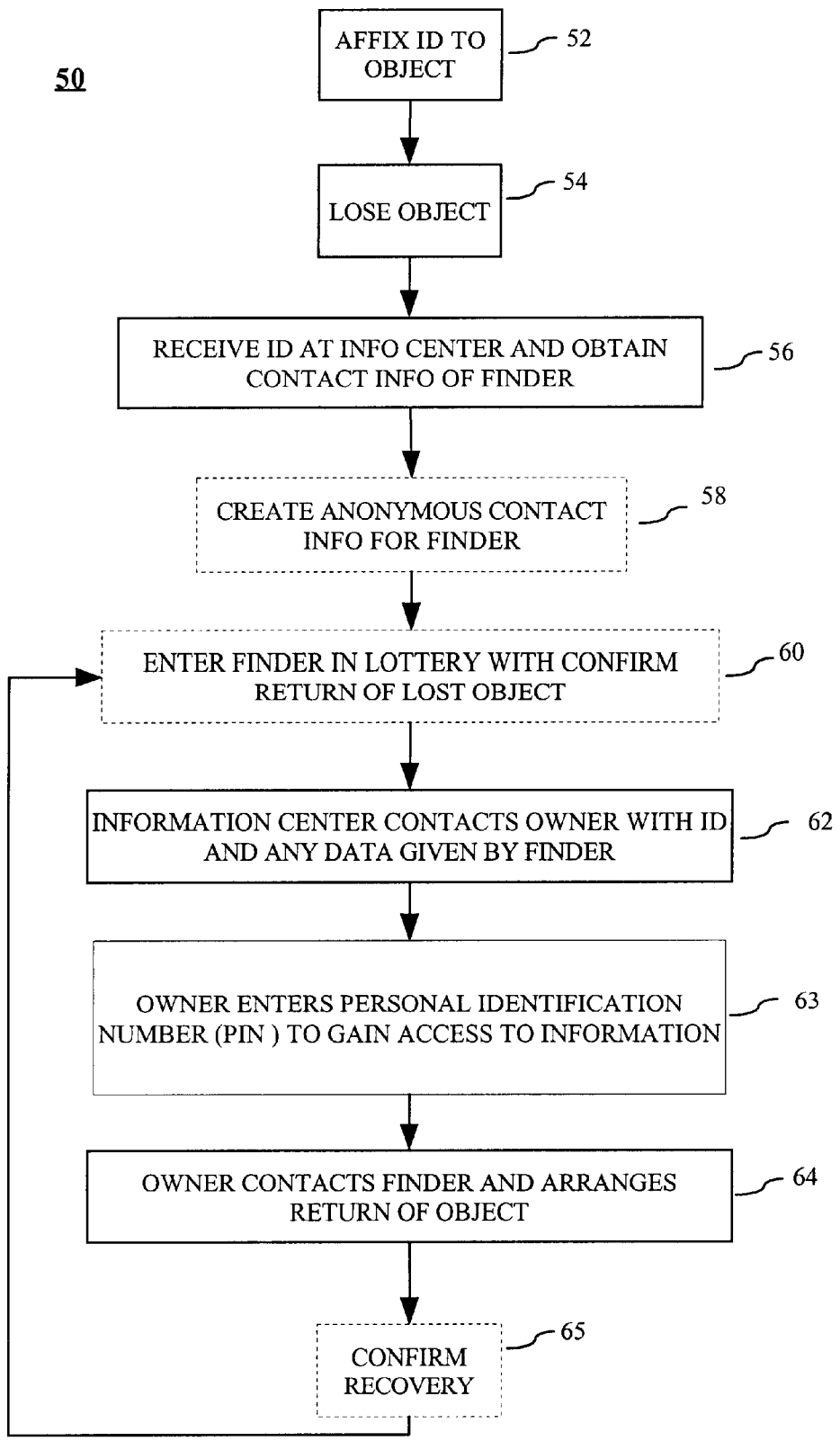
FIG. 5 is a flow chart illustrating a method of identifying and restoring an object to a rightful owner in accordance with the present invention.

Referring to FIG. 5, a flow chart illustrating a method 50 of identifying and restoring an object to an owner who has lost the object is shown. The method 50 preferably comprises the step 52 of affixing a pre-assigned identification number associated with the owner and a toll-free telephone number or website to the object. The object is lost at step 54. At step 56 an information center receives the pre-assigned identification number from a finder. Next, at step 58, the system can optionally create anonymous contact information for the finder. This can simply be an email account or a toll free number allowing the finder to provide information as to the whereabouts of the lost object. For total anonymity, finder may elect to surrender property to any government, law enforcement, or fire department center or official or any reputable area business such as restaurants, insurance agencies or retail stores for the eventual retrieval by the owner. In another option of the present invention, at step 60, the finder can be automatically entered into a lottery if the finder provides sufficient information identifying them. Ideally, the entry into the lottery is only done once confirmation of the return of the lost object(s) is provided. At step 62, the call center or information center contacts the owner in response to receiving the ID and provides the owner with any data given by the finder. The information can contact the owner by sending an automated electronic mail notifying the owner to contact a website having access to a database containing information associated with the pre-assigned identification number. As mentioned previously with step 58 anonymous email accounts can be created for the finder and/or the owner to anonymously correspond. Optionally, as shown in step 63, the owner is enabled to receive information regarding the object and the finder only after entering an owner personal identification number with the information center. At step 64, the owner then contacts the finder and makes arrangements for the return of the lost object. Optionally, as previously mentioned, the owner can provided confirmation of recovery of the lost object and thus enabling the entry of the finder into a lottery for prizes. To encourage confirmations, a portion of the prize could also go to the owner of the lost object.

The present invention provides an economical and simple manner to recover lost items. The ID tags are easily attached to an object and should be simple to register. Ideally, the owner is registered to a particular ID tag in perpetuity until the owner authorizes changes to the data associated with the ID tag, including changes in address or in name to allow for transferability of such tags. The tag is ideally small and inconspicuous and provides anonymity to the owner if desired. Individual security is preferably provided by releasing information to persons with knowledge of a PIN. In conjunction with the tags, advertising could be provided on such tags or insurance incentives could be provided to those who register their items. Even without the incentives previously mentioned for the finder, it is believed that most people would call if they found a valuable object having such ID and such simple means of returning the object.

The description above is intended by way of example only and is not intended to limit the present invention in any way except as set forth in the following claims.

What is claimed is:

1. A system for identifying and restoring an object to an owner who has lost the object, comprising:
    a tag that is affixed to the object that includes a pre-assigned identification number associated with the owner and a toll-free telephone number;
    a call center that contacts the owner in response to a call to the toll-free telephone number receiving the pre-assigned identification number from a finder and enabling the owner to receive information regarding the object after entering an owner personal identification number, wherein the system automatically enters the finder in a lottery for a predetermined prize.

2. The system of claim 1, wherein the tag is a metallic or plastic tab having an aperture allowing the tag to be affixed to a key-ring.

3. The system of claim 1, wherein the tag is a sticker that is adhesively applied to the object.

4. The system of claim 1, wherein the system enables the owner to anonymously receive information regarding the object and the finder without providing information to the finder.

5. The system of claim 1, wherein the system automatically enters the finder in a lottery for a predetermined prize provided that the owner confirms recovery of the object.

6. A system for identifying and restoring an object to an owner who has lost the object, comprising:
    a tag that is affixed to the object that includes a pre-assigned identification number associated with the owner and a website domain name;
    an information center that contacts the owner in response to an entry of the pre-assigned identification number from a finder and enabling the owner to receive information regarding the object after entering an owner personal identification number associated with the pre-assigned identification number, wherein the system further prompts the finder to enter in a lottery for a predetermined prize in response to the entry of the pre-assigned identification number from the finder.

7. The system of claim 6, wherein the call center contacts the owner by sending an automated phone call enabling the owner to respond.

8. The system of claim 6, wherein the call center contacts the owner by sending an automated electronic mail notifying the owner to contact a website having access to a database containing information associated with the pre-assigned identification number.

9. The system of claim 6, wherein the system automatically enters the finder in a lottery for a predetermined prize provided that the owner confirms recovery of the object.

10. The system of claim 6, wherein the system allows the finder to create an anonymous email account to correspond with the owner.

11. A method of identifying and restoring an object to an owner who has lost the object, comprising the steps of:
    affixing a pre-assigned identification number associated with the owner and a toll-free telephone number or website to the object;
    providing an information center that contacts the owner in response to receiving the pre-assigned identification number from a finder;
    enabling the owner to receive information regarding the object after entering an owner personal identification number with the information center; and
    creating an email account for the finder to anonymously correspond with the owner.

12. The method of claim 11, wherein the method further comprises the step of enabling the owner to anonymously receive information regarding the object and the finder without providing information to the finder.

13. The method of claim 11, wherein the method further comprises the step of automatically entering the finder in a lottery for a predetermined prize.

14. The method of claim 11, wherein the call center contacts the owner by sending an automated phone call enabling the owner to respond.

15. The method of claim 11, wherein the method further comprises the step of contacting the owner by sending an automated electronic mail from the information center notifying the owner to contact a website having access to a database containing information associated with the pre-assigned identification number.

16. The system of claim 11, wherein the method further comprises the step of creating an anonymous email account for the owner to correspond with the finder.

* * * * *